(12) United States Patent
Schildermans et al.

(10) Patent No.: US 8,449,642 B2
(45) Date of Patent: May 28, 2013

(54) FILTER MEDIUM

(75) Inventors: Inge Schildermans, Marke (BE); Frank Verschaeve, Otegem (BE); Johan Vandamme, Deinze (BE); Eddy Lambert, Deerlijk (BE)

(73) Assignee: NV Bekaert SA, Zwevegem (BE)

( * ) Notice: Subject to any disclaimer, the term of this patent is extended or adjusted under 35 U.S.C. 154(b) by 470 days.

(21) Appl. No.: 12/669,009

(22) PCT Filed: Jul. 4, 2008

(86) PCT No.: PCT/EP2008/058695
§ 371 (c)(1),
(2), (4) Date: Jan. 13, 2010

(87) PCT Pub. No.: WO2009/010408
PCT Pub. Date: Jan. 22, 2009

(65) Prior Publication Data
US 2010/0196218 A1 Aug. 5, 2010

(30) Foreign Application Priority Data
Jul. 16, 2007 (EP) .................................... 07013867

(51) Int. Cl.
*B01D 39/14* (2006.01)
*B01D 24/00* (2006.01)
*B01D 39/06* (2006.01)
*B01D 50/00* (2006.01)

(52) U.S. Cl.
USPC ................. 55/523; 55/522; 55/524; 422/169; 422/170; 422/171; 422/172; 422/177; 422/178; 422/179; 422/180; 422/181; 422/182

(58) Field of Classification Search
USPC ............. 55/522–524; 422/169–172, 177–182
See application file for complete search history.

(56) References Cited

U.S. PATENT DOCUMENTS 3,087,233 A * 4/1963 Turnbull ....................... 428/605
3,379,000 A   4/1968 Webber et al.
(Continued)

FOREIGN PATENT DOCUMENTS
DE 1996059 U 11/1968
DE 1924836 A1 1/1970
(Continued)

OTHER PUBLICATIONS

Examination Report of China IP Office regarding CN 200880024895.5, Jan. 11, 2012.
(Continued)

*Primary Examiner* — Amber Orlando
(74) *Attorney, Agent, or Firm* — Bacon & Thomas, PLLC

(57) ABSTRACT

A filter medium (100) having an inflow side (110) and an outflow side (120) defining a flow direction (190). The filter medium comprises at least n consecutive layers Lx of fiber media, x varying from 1 to n, n being more than or equal to 2. L1 (101) is the layer of the n consecutive layers closest to the inflow side of the filter medium and Ln (103) is the layer of the n consecutive layers closest to the -outflow side of the filter medium. For all layers Lx of the at least n consecutive layers, the ratio Hx/(kx*Ax) is substantially identical, wherein Hx is the average thickness of the layer Lx in flow direction, Ax is the average surface area of cross sections according to planes perpendicular to the flow direction, and kx is the permeability coefficient of this layer Lx. The fiber media of at least part of the layers of the filter medium comprises metal fibers.

14 Claims, 1 Drawing Sheet

U.S. PATENT DOCUMENTS

| | | | |
|---|---|---|---|
| 3,469,297 A * | 9/1969 | Webber | 428/605 |
| 3,759,708 A | 9/1973 | Sundberg et al. | |
| 4,664,971 A | 5/1987 | Soens | |
| 5,027,886 A | 7/1991 | Strom-Olsen et al. | |
| 5,403,367 A | 4/1995 | De Villiers et al. | |
| 5,457,945 A * | 10/1995 | Adiletta | 55/301 |
| 5,470,364 A * | 11/1995 | Adiletta | 55/484 |
| 5,637,216 A * | 6/1997 | Dillier | 210/335 |
| 5,679,441 A * | 10/1997 | Saelens et al. | 428/198 |
| 5,961,931 A * | 10/1999 | Ban et al. | 422/171 |
| 6,007,608 A | 12/1999 | Johnson | |
| 6,667,017 B2 * | 12/2003 | Murrell et al. | 423/210 |
| 6,776,815 B2 * | 8/2004 | Kato et al. | 55/492 |
| 6,889,852 B1 * | 5/2005 | Loncke et al. | 210/490 |
| 6,968,681 B2 * | 11/2005 | Stephani et al. | 60/297 |
| 6,997,974 B2 * | 2/2006 | Tran et al. | 95/273 |
| 7,112,237 B2 * | 9/2006 | Zeller et al. | 95/273 |
| 7,311,751 B2 * | 12/2007 | Mei et al. | 55/527 |
| 2004/0040268 A1 * | 3/2004 | Wastijn et al. | 55/282.3 |
| 2004/0065079 A1 | 4/2004 | Stephani et al. | |
| 2004/0065606 A1 * | 4/2004 | Devooght et al. | 210/483 |
| 2004/0131511 A1 * | 7/2004 | Marrecau et al. | 422/174 |
| 2005/0223688 A1 * | 10/2005 | Mei et al. | 55/523 |
| 2006/0277881 A1 * | 12/2006 | Mei et al. | 55/525 |
| 2007/0009400 A1 * | 1/2007 | Vakkilainen et al. | 422/171 |
| 2007/0041880 A1 * | 2/2007 | Reinsch et al. | 422/177 |
| 2007/0220856 A1 * | 9/2007 | Cho et al. | 55/525 |

FOREIGN PATENT DOCUMENTS

| | | |
|---|---|---|
| EP | 0280340 A1 | 1/1988 |
| EP | 0319959 A2 | 12/1988 |
| EP | 0810021 A1 | 12/1997 |
| EP | 0960645 A3 | 12/1999 |
| JP | 2002045629 A | 2/2002 |
| JP | 2002054423 A | 2/2002 |
| JP | 2004526091 A | 8/2004 |
| JP | 2007501705 A | 2/2007 |
| WO | 02/057035 A1 | 7/2002 |
| WO | 03/047720 A1 | 6/2003 |
| WO | 2004/104386 A2 | 12/2004 |
| WO | 2004104386 A2 | 12/2004 |
| WO | 2006/015783 A1 | 2/2006 |

OTHER PUBLICATIONS

Japan Examination Report in JP 516453/2010, Mar. 21, 2012.
XP002473718; AN 1993-408381, JP 05 305207 A, Filtration KK, Nov. 19, 1993.
XP002473719; AN 2002-367613, JP 2002 058939 A, Hino Motors Ltd., Feb. 26, 2002.
XP002474030; AN 2003-757668, CN 1 436 924 A, Univ Qinghua, Aug. 20, 2003.
International Search Report in PCT/EP2008/058695, Nov. 20, 2008.

* cited by examiner

FILTER MEDIUM

TECHNICAL FIELD OF THE INVENTION

The present invention relates to a filter medium, and in particular a filter medium for filtering diesel exhaust gasses of a diesel combustion device such as a diesel combustion engine, an automotive vehicle including the diesel soot filter medium as well as a method of manufacture and operating of the filter medium.

BACKGROUND OF THE INVENTION

Filter medium comprising metal fibers are known in the art. As an example, WO03/047720 discloses a multilayered sintered metal fiber filter medium for filtration of diesel soot from exhaust gas of a diesel combustion engine. Although performing satisfactorily, this medium may have the disadvantage that only limited amount of soot can be held before the medium gets clogged. As a result, very frequent and numerous regeneration actions need to take place, e.g. by regeneration using electrical regeneration (i.e. conducting electrical current through the medium, causing a heating of the medium due to the Joule effect) or regeneration by injection of catalytic compounds in the diesel or exhaust gas. Other disadvantages are that this medium is limited in efficiency and is rather expensive.

An alternative, multilayered filter medium suitable for filtering diesel exhaust gasses of a diesel combustion device such as a diesel combustion engine, is described in WO04/104386. This medium has, due to its substantially larger thickness, an increased soot holding capacity. The medium has the disadvantage that in order to reach this increased soot holding capacity, large volumes are needed and relative high pressure drops over the filter medium may be obtained, also in case of fresh, i.e. unused, filter media. The large amounts of soot may however be disadvantageous in case other exhaust cleaning elements are used downstream the filter media, e.g. elements reducing NOx to NO2 by means of SCR-processes. During regeneration, the large amounts of soot is ignited and during oxidation, a too large temperature may be provided to the exhaust gasses passing the filter media and hence the SCR-process during regeneration. These high temperatures may negatively influence the working of the SCR-processes.

SUMMARY OF THE INVENTION

It is an object of the present invention to provide an improved filter medium, and method of making and operating the same. For example, the medium and method may solve at least some of the problems of the filter medium as known in the prior art. It is an advantage of some embodiments of the present invention to provide a filter medium, which has equal or better filter efficiency than some of the presently known media. It can also be an advantage of some embodiments of the present invention to provide a filter medium which is less expensive to produce. It can also be an advantage of some embodiments of the present invention to provide a filter medium which provides acceptable soot loading capacity, however optionally requiring less volume as compared to presently known soot filter media.

Some of the embodiments of the present invention show a more equal and homogeneous soot retention over the volume of the filter medium. It is believed such more homogeneous loading of the filter medium may be caused by the uniform pressure drop the gas flow experiences when flowing through the filter medium.

In case the filter medium is used to filter exhaust gas, e.g. from a diesel combustion device such as a diesel combustion engine, the reduced pressure drop over the filter medium cause the combustion device to be subjected to a lower back pressure. Hence this may result in a lower fuel consumption and thus lower operation casts of the diesel combustion device such as a diesel combustion engine, which is provided with an exhaust filter comprising filter media according to the present invention.

The above objective is accomplished by a filter medium and a method of manufacturing a filter medium according to the present invention.

According to a first aspect of the present invention, a filter medium is provided. The filter medium has an inflow side and an outflow side defining a flow direction. The filter medium comprises at least n consecutive layers $L_x$ of fiber media, x varying from 1 to n, n being more than or equal to 2. $L_1$ is the layer of the n consecutive layers closest to the inflow side of the filter medium and $L_n$ is the layer of the n consecutive layers closest to the outflow side of the filter medium. For all layers $L_x$ of the at least n consecutive layers, the ratio $H_x/(k_x * A_x)$ is substantially identical, wherein $H_x$ is the average thickness of the layer $L_x$ in flow direction, $A_x$ is the average surface area of cross sections according to planes perpendicular to the flow direction, and $k_x$ is the permeability coefficient of this layer $L_x$.

For a given debit Q ($m^3$/hour) of a fluid with a dynamic viscosity p, which flows through a filter layer, a pressure drop $\Delta P$ over a filter layer will be obtained, which pressure drop can be calculated using the Darcy formula:

$$\Delta P = \mu * (H/k) * (Q/A), \text{ wherein}$$

$\Delta P$ is the pressure drop over the filter layer.

$\mu$=the dynamic viscosity of the fluid used;

Q=the quantity of fluid flowing through the layer per time unit.

A=the surface of the filter layer to which the volume Q is provided. This is in other words the surface area of a cross section according to a plane perpendicular to the flow direction.

Q/A=the gas velocity when flowing through the filter layer;

H/k=permeability factor

H=thickness (m)

k=permeability coefficient ($1/m^2$)

Thus, when the filter medium according to the present invention is used to filter a given quantity of fluid per time unit (Q), which fluid has a given dynamic viscosity p, this results in a substantially equal $\Delta P$ over each of the $L_x$ layers of the at least n consecutive layers. This may be obtained by properly selecting $H_x$, $k_x$ and $A_x$ for obtaining the substantially equal $\Delta P$.

Usually a fluid volume per time unit Q of 250 $Nm^3$/h or 450 $Nm^3$/h is used, using a gas of which the dynamic viscosity $\mu$ is 0.000347 Poise at 450° C., which is typically the dynamic viscosity of exhaust gasses of diesel combustion engines. A pressure drop of 10 mbar for a fluid volume per time unit Q of 250 $Nm^3$/h or a pressure drop of 50 mbar for a fluid volume per time unit Q of 450 $Nm^3$/h is preferred.

The number of n consecutive layers is more than or equal to 2, and optionally ranges from 3 to 6, such as 3, 4, 5, 6.

$\Delta P$ is measured by providing a flow at a constant pressure drop over the filter medium (200 Pa) and measure the flow rate, i.e. the amount of gas or air passing per time unit. Knowing the dimensions for the filter medium and using the Darcy formula the H/k can be calculated.

A substantially identical ratio $H_x/(k_x*A_x)$ is to be understood as only differences in the ratio $H_x/(k_x*A_x)$ between adjacent layers are found, lying within the normal measurement tolerances.

The term "substantially equal pressure drop $\Delta P$" is to be understood as would a pressure drop measured over a first layer, say La, and a pressure drop measured over a second layer, say Lb, be considered equal if the difference between La and Lb would not be more than the normal measurement tolerances, such as about 14%, The filter media according to the first aspect of the present invention uses less fiber material to provide a filter medium with acceptable soot retention and filter efficiency, in particular for filtering soot from diesel exhaust gasses of combustion devices.

The filter medium may have a constant surface area for cross sections perpendicular to the flow direction all along the length of the flow path. Optionally the filter medium has a substantially cylindrical volume. Optionally the filter medium has a conical volume, optionally with the smallest surface of the conical shape providing the inflow side of the filter medium.

According to embodiments of the present invention, a filter medium may have an inflow side and an outflow side defining a flow direction. The filter medium may comprise at least n consecutive layers $L_x$ of fiber media, x varying from 1 to n, n being more than or equal to 2. L1 is the layer of the n consecutive layers providing the inflow side of said filter medium. Ln is the layer of the n consecutive layers closest to the outflow side of said filter medium, optionally providing the outflow side. For all layers $L_x$ of the at least n consecutive layers of the filter medium, the ratio $H_x/(k_x*A_x)$ is substantially identical, wherein $H_x$ is the average thickness of the layer $L_x$ in flow direction, $A_x$ is the average surface area of cross sections according to planes perpendicular to the flow direction, and $k_x$ is the permeability coefficient of this layer $L_x$. The filter medium may comprise one additional layer of fiber medium $L_m$ providing the outflow side of the filter medium.

According to some embodiments, all n consecutive layers may have a substantially equal H/k.

Optionally $H_x$ may range from e.g. 15 mm to 250 mm.

According to some embodiments, the filter medium may comprise at least one additional layer $L_m$ of fiber media. According to some embodiments, the at least one additional layer $L_m$ of fiber media may be provided downstream in flow direction from the at least n consecutive layers $L_x$.

The $H_m/k_m*A_m$, hence the pressure drop $\Delta P$ over the layer $L_m$, which $L_m$ may optionally provide the outflow side, may be different from $H_x/k_x*A_x$ respectively the pressure drop of the layers $L_x$ for which $1 \leq x \leq n$. Optionally the pressure drop $\Delta P$ over the layer $L_m$ is less than the pressure drop over each of the layers upstream this last layer $L_m$. $H_m/k_m*A_m$ is thus optionally less than the $H_x/k_x$ each of the layers $L_x$ upstream this last layer $L_m$. As an example, the last layer may be a layer of sintered metal fibers (Fecralloy®-type alloy) having a porosity of 80%, a thickness H of 0.42 mm and a k-factor of 1.35E-10. A pressure drop over the layer $L_m$ of about 3 mbar to 10 mbar may be acceptable.

Optionally the filter medium comprises further additional layers of fiber medium being provided upstream or downstream in flow direction from the at least n consecutive layers $L_x$.

Optionally the first layer the at least n consecutive layers $L_x$, provide the inflow side of the filter medium.

According to some embodiments, the at least one layer $L_m$ is a sintered layer.

According to some embodiments, all layers have a substantially equal cross sectional surface, being the surface of a cross section according to a plane perpendicular to the flow direction.

According to some embodiments, the fiber media of at least part of the layers of the filter medium may comprise metal fibers. Optionally the fiber media of all the layers of the filter medium may comprise metal fibers.

Optionally all layers of the filter medium may comprise or even may consist of metal fibers.

Any type of metal or metal alloy may be used to provide the metal fibers. The metal fibers are for example made of steel such as stainless steel. Optionally stainless steel alloys are AISI 300 or AISI 400-serie alloys, such as AISI 316L or AISI 347, or alloys comprising Fe, Al and Cr, stainless steel comprising Chromium, Aluminum and/or Nickel and 0.05 to 0.3% by weight of Yttrium, Cerium, Lanthanum, Hafnium or Titanium, such as e.g. DIN 1.4767 alloys or Fecralloy®, are used. Also Cupper or Cupper-alloys, or Titanium or Titanium alloys may be used. The metal fibers can also be made of Nickel or a Nickel alloy.

Metal fibers suitable to provide a filter medium are e.g. coil shaved fibers, bundle drawn (and optionally crimped) metal fibers, melt extracted fibers, or may be machined fibers such as steel wool fibers, grinded or milled fibers, or fibers obtained by the method as disclosed in WO2006/015783. As a further alternative, metal wire such as fine metal wire may be used. Metal fibers may be made by any presently known metal fiber production method, e.g. by bundle drawing operation, by coil shaving operation as described in JP3083144, by wire shaving operations (such as steel wool) or by a method providing metal fibers from a bath of molten metal alloy. In order to provide the metal fibers with their average length, the metal fibers may be cut using the method as described in WO02/057035, or by using the method to provide metal fiber grains such as described in U.S. Pat. No. 4,664,971. The metal fibers used to provide the sintered metal fiber medium are characterized in having an equivalent diameter D.

Preferably the equivalent diameter D of the metal fibers is less than 100 µm such as less than 65 µm, more preferably less than 36 µm such as 35 µm, 22 µm or 17 µm. Optionally the equivalent diameter of the metal fibers is less than 15 µm, such as 14 µm, 12 µm or 11 µm, or even less than 9 µm such as e.g. 8 µm. Optionally the equivalent diameter D of the metal fibers is less than 7 µm or less than 6 µm, e.g. less than 5 µm, such as 1 µm, 1.5 µm, 2 µm, 3 µm, 3.5 µm, or 4 µm.

The metal fibers may be endless metal fibers, endless fibers being also known as filaments, or may have an average fiber length Lfiber, optionally ranging e.g. from 0.1 cm to 5 cm.

According to some embodiments, the metal fibers may be bundle drawn metal fibers.

According to some embodiments, at least one of the layers is a sintered layer.

According to some embodiments, each of n consecutive layers $L_x$ is a non sintered layer.

The presence of such layers avoids holes being burned in the filter medium during regeneration, for example in case locally a too large concentration of soot particulates is combusted during such regeneration phase.

Non sintered layers, also referred to as fiber webs or non woven layers, may be provided by any known webbing technique such as air laying, dry laying or wet laying techniques.

According to some embodiments, each of the at least n consecutive layers $L_x$ comprises fibers, the fibers of each of said layers $L_x$ may have an equivalent diameter $D_x$, for which $D_x \geq D_{x+1}$, for which $1 \leq x \leq n$.

According to some embodiments, all layers Lx of the n consecutive layers may have a porosity in the range of 90% to 99%.

Optionally the porosity of the n consecutive layers Lx, thus for which $1 \leq x \leq n$ is in the range of 90% to 99%, such as in the range of 93% to 97%, e.g. 95% or 97%.

Optionally the all n consecutive layers Lx have an equal porosity, such as a porosity in the range of 90% to 99%, such as in the range of 93% to 97%, e.g. e.g. 95% or 97%.

Optionally the porosity of at least one of the additional layers Lm is in the range of 80% to 99%.

According to some embodiments, at least one of the layers comprises a catalyst.

The first layer may be provided with a Pt/Pd catalyst working as a DOC diesel oxidation catalyst for oxidizing NO and NOx to $NO_2$.

Alternatively the first layer may be provided with catalyst functioning as a hydrolyser catalyst for cooperating with injected urea. A further layer may be provided with the DOC catalyst as set out above.

According to some embodiments, the filter medium further may comprise metal foam layers or porous medium layers comprising hollow metal spheres. Optionally, the filter medium further comprises ceramic fibres.

The present invention further relates to the use of a diesel soot particulate filter in accordance with embodiments of the present invention in an automotive vehicle such as in a truck or a bus as well as the automotive vehicle including the particulate filter. The filter medium may be suitable to be used as a diesel soot particulate filter medium being used in a diesel soot particulate filter.

According to a second aspect of the present invention, a method of manufacturing a filter medium is provided, the filter medium having an inflow side and an outflow side defining a flow direction. The method comprises forming at least n consecutive layers Lx of fiber media, x varying from 1 to n, n being more than or equal to 2, L1 being the layer of the n consecutive layers closest to the inflow side of the filter medium and Ln being the layer of the n consecutive layers closest to the outflow side of the filter medium. For all layers Lx of the at least n consecutive layers, the ratio $Hx/(kx*Ax)$ is substantially identical, wherein Hx is the average thickness of the layer Lx in flow direction, Ax is the average surface area of cross sections according to planes perpendicular to the flow direction, and kx is the permeability coefficient of this layer Lx.

According to some embodiments of the present invention, each of the fibre media may be provided by
  Providing a consolidated fiber structure comprising fibers, the consolidated fiber structure having at least a leading edge;
  Coiling the consolidated fiber structure about a coiling axis parallel to the leading edge thereby providing the fiber medium.

Optionally a gas impermeable casing or housing contacting the outer boundary of the coiled consolidated fiber structure in the direction substantially parallel to the coiling axis may be provided.

As such a fiber medium with optionally a casing or housing is provided, which comprises fibers of which a majority of the fibers, such as at least 50% or at least 85%, at least partially encircle the axis used to coil the consolidated fiber structure. The consolidated fiber structure may be a fiber web or one or more fiber bundles.

The term "encircle" is to be understood as to pass around. Hence "a fiber which at least partially encircle an axis" means that the fiber at least partially pass around the axis.

According to some embodiments of the present invention, a majority of fibers substantially may extend at least in the coiling direction, i.e. the axis about which the consolidated fiber structure is coiled or wound. At least 50% of the fibers present in the filter material substantially may extend at least in this axial direction. Optionally at least 85% of the fibers present in the filter material substantially may extend at least in this axial direction.

According to some embodiments of the present invention, the consolidated fiber structure may be a fiber web. The fiber web may be a fiber web obtained by any suitable web forming process, such as air laid web, wet lad web or a carded web. The web is preferably a nonwoven web, optionally needle punched.

The consolidated fiber structure may comprise at least one fiber bundle. The consolidated fiber structure may comprise at least one, optionally a plurality of identical or mutually different bundles, differing in type of fibers, fiber properties, such as fiber equivalent diameter or fiber material, or bundle properties such as bundle fineness.

The fiber bundle may be a fiber bundle obtained by any suitable bundle forming process. As an example, the fiber bundle may be a card sliver.

The consolidated fibre structure, such as a web or at least one fiber bundle, which is coiled or wound about an axis parallel to one of its edges, optionally wound about the edge itself, has the tendency to radially expand outwards The bundle may be a bundle of coil shaved metal fibers. Alternatively the bundle may be a bundle of metal fibers obtained by bundle drawing. The bundle drawn metal fibers are optionally crimped fibers, e.g. by means of the method as set out in EP280340.

The bundle may comprise a plurality of metal fibers, such as in the range of 200 to 10000 fibers or filaments, or even more.

In case a web comprising metal fibers is used, the web may be provided by air laid or wet laid processes. The metal fiber web may e.g. have a thickness of 1 mm to 50 mm and a surface weight of 100 $g/m^2$ to 600 $g/m^2$.

The filter material may further comprise powder elements such as metal powder particles, and/or may comprise catalytic components.

The filter medium may be used in a filter element. The filter element has a filter volume, which volume is filled with the filter medium. The shape of filter volume, hence of the filter element, may be adapted to the outer shape of filter medium.

According to some embodiments of the present invention, the filter volume may be cylindrical. The filter volume may optionally be conical. For cylindrical filter volumes, optionally the filter volume may be cylindrical with a circular or an elliptical cross section.

A filter element may comprise a casing, or "housing", delimiting the outer boundary of a filter volume. The casing has an inflow side and an outflow side defining an average flow direction, the casing having an axis substantially parallel to the average flow direction. The casing delimits the outer boundary of the filter volume in the direction of the average flow path. The casing is gas impermeable in a radial direction. The filter volume is filled with a filter medium according to the present invention. The filter medium may comprise fibers, wherein a majority of the fibers at least partially encircle the axis.

The filter element comprising the filter medium according to the present invention may be used for filtering diesel exhaust gasses of a diesel combustion device such as a diesel combustion engine. The diesel combustion engine may be the engine of an automotive vehicle such as a truck or a bus. The filter medium may be suitable to be used as a diesel soot particulate filter medium being used in a diesel soot particulate filter.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
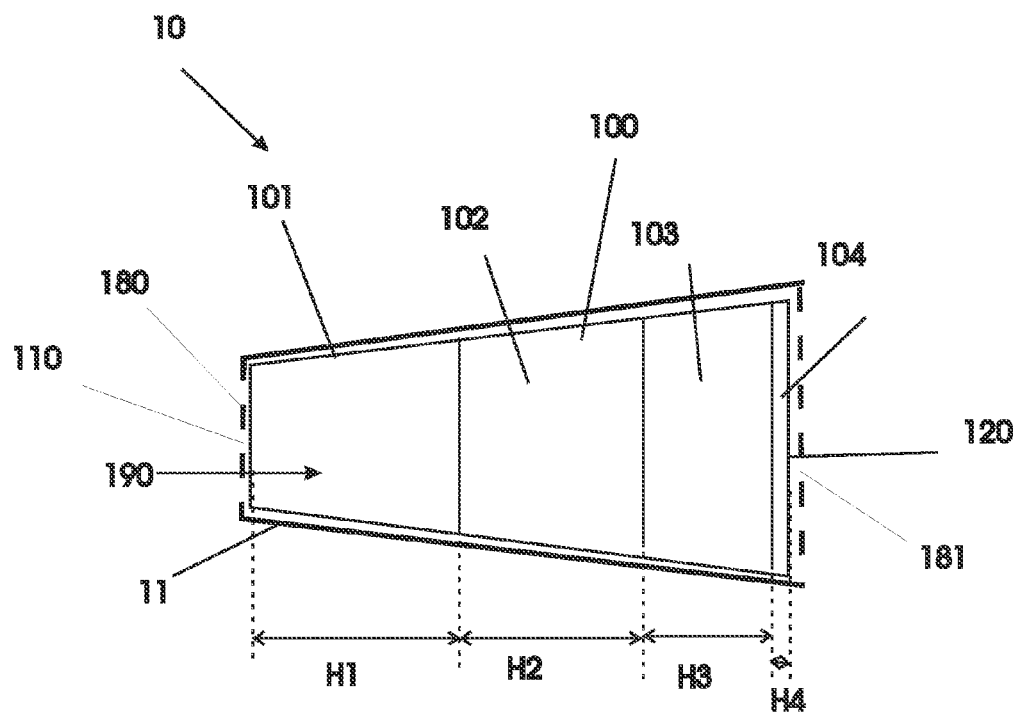
FIG. 1 is a schematically view of a cross section of a filter medium according to an embodiment of the present invention.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

The following terms are provided solely to aid in the understanding of the invention. These definitions should not be construed to have a scope less than understood by a person of ordinary skill in the art.

The term "porosity" represents the average porosity of a layer, averaged out over the layer in width, length and depth of the layer. The term "porosity P" of a layer is to be understood as 100-D, wherein D is the density of the layer. The density D of a layer made from a given material is the ratio, expressed in percentage, of the weight per volume of the layer over the theoretical weight of that same volume, in case this whole volume would have been provided completely out of said material.

The term "equivalent diameter" of a fiber is to be understood as the diameter of an imaginary circle, having the same surface as the average surface of a radial cross section of the fiber.

The term "coil shaved" metal fiber is to be understood as a fiber obtainable by a method as described in EP319959A.

The term "bundle drawn" metal fiber is to be understood as a fiber obtainable by a method as described in EP280340A or U.S. Pat. No. 3,379,000.

The term "melt extracted" metal fiber is to be understood as a fiber obtainable by a method as described in U.S. Pat. No. 5,027,886.

According to a first embodiment of the present invention, as shown in FIG. 1, a filter element 10, suitable to be used as a diesel soot particulate filter element of a diesel soot particulate filter, comprises a filter medium 100 and has an inflow side 110 and an outflow side 120.

The filter medium 100 is suitable to be used as part of a diesel soot particulate filter element of a diesel soot particulate filter.

The filter element 10 further comprises a housing 11, which contacts the outer surface of the filter medium 100. The housing 11, hence the filter element 10, has a substantially conical outer volume. The filter medium 100 comprises a number of layers of filter media, e.g. up to 3 or more consecutive layers Lx and one additional layer Lm of filter media. Hence x can vary from 1 to 3 or higher. As such, the three consecutive layers are layer L1 (indicated 101 in FIG. 1), layer L2 (indicated 102 in FIG. 1) and layer L3 (indicated 103 in FIG. 1). The additional layer Lm is layer L4 (indicated 104 in FIG. 1). L1 provides the inflow side 110 of the diesel soot particulate filter 100. L4 provides the outflow side 120 of the filter medium 100. The n consecutive layers Lx, i.e. the layers L1, L2 and L3 have a substantially equal ratio Hx/kx*Ax.

The thickness Hx for the layers Lx is the length of the flow path that a gas volume would follow when following through the layer in the average low direction 190. In this embodiment, the average flow direction 190 is parallel to the axis of the substantially conical shape of the filter element 10. Ax is the average surface area of cross sections of the layer Lx, cross sections being made according to planes perpendicular to the flow direction.

Table 1 provides the properties of the layers Lx of an embodiment of a filter medium 100 as shown in FIG. 1, as well as the properties of the one additional layer Lm, being L4 in this embodiment.

The layers comprises metal fibers, which have properties as also shown in table 1

TABLE 1

|  | L1 (101) | L2 (102) | L3 (103) | L4 (104) |
|---|---|---|---|---|
| Hx (mm) | 115 | 75 | 50 | 0.3 |
| kx (m$^2$) | 6.23E−09 | 2.88E−09 | 1.79E−09 | 6.86E−11 |
| Porosity (%) | 97 | 97 | 97 | 80 |
| Sintered or not sintered | Sintered or not sintered | Sintered or not sintered | Sintered or not sintered | Sintered |
| Fiber eq. Diameter (μm) | 35 | 22 | 17 | 22 |
| Fiber alloy | Fecralloy 1.4767 mod | Fecralloy 1.4767 mod | Fecralloy 1.4767 mod | Fecralloy 1.4767 mod |
| Fiber production method | coil shaved | bundle drawn | bundle drawn | bundle drawn |

For the n, in this embodiment 3 consecutive layers, i.e. the layers Lx, for which 1≦x≦3, an identical ratio Hx/kx*Ax of may be obtained by appropriate selection of Ax.

The filter medium 100 has a total thickness (being the sum of H1, H2 H3 and H4) of 240.3 mm. All layers, i.e. the 3 consecutive layers L1 to L3, and the fourth additional layer L4, are provided one adjacent to the other. For all layers except the first layer (L1) and last layer (L4) in flow direction, the surface of the layer oriented to the inflow side contacts the surface of the layer being adjacent and upstream, which surface is oriented to the outflow side. The conical shape tapers from a small side to a larger side, its smallest side being the inflow side 110 and its largest side being the outflow side 120.

Figure 2:
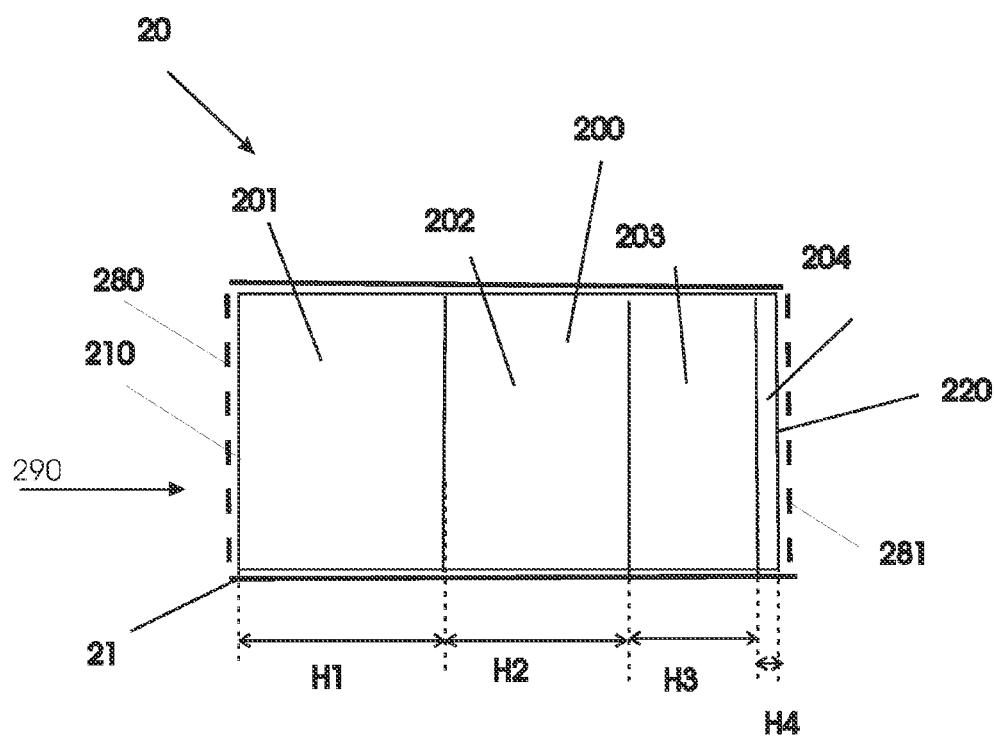
FIG. 2 is a schematically view of a cross section of a filter medium according to another embodiment of the present invention.

According to a second embodiment of the present invention, as shown in FIG. 2, a filter element 20, suitable to be used as a diesel soot particulate filter element of a diesel soot particulate filter, comprises a filter housing 21 and a filter medium 200, having an inflow side 210 and an outflow side 220. The filter element 20 further comprises a housing 21, which contacts the outer surface of the filter medium 200. The housing 21, hence the filter element, has a substantially cylindrical outer volume.

The thickness Hx for a layer Lx is the length of the flow path that a gas volume would follow when flowing through the layer in the average flow direction 290, which in this embodiment is substantially parallel to the cylindrical wall of the housing 21 and thus to the cylinder axis. Ax is the average surface area of cross sections according to planes perpendicular to the flow direction. As the filter medium 200 is substantially cylindrical shaped, Ax is substantially constant along the flow direction 290, and identical for the all layers Lx. Ax may vary e.g. in the range up to 51270 mm$^2$ or even up to 96208 mm$^2$ or more.

The filter medium 200 comprises a number of layers of filter media, e.g. up to 3 consecutive layers Lx and one additional layer Lm of filter media, so x varies from 1 to 3 or maybe more. As such, the three consecutive layers are layer L1 (indicated 201 in FIG. 2), layer L2 (indicated 202 in FIG. 2) and layer L3 (indicated 203 in FIG. 1). The additional layer Lm is layer L4 (indicated 204 in FIG. 2). L1 provides the inflow side 210 of the diesel soot particulate filter 200. L4 provides the outflow side 220 of the filter medium 200.

Table 2 provides the properties of the three layers Lx and the one additional layer Lm of a possible embodiment of a filter medium 200 as shown in FIG. 2.

The layers comprise metal fibers, which have properties as also shown in table 2.

TABLE 2

|  | L1 (201) | L2 (202) | L3 (203) | L4 (204) |
|---|---|---|---|---|
| Hx (mm) | 115.0 | 53.2 | 33.0 | 0.3 |
| Ax (m$^2$) | 0.0127 | 0.0127 | 0.0127 | 0.0127 |
| kx (m$^2$) | 6.23E−09 | 2.88E−09 | 1.79E−09 | 6.86E−11 |
| Porosity (%) | 97 | 97 | 97 | 80 |
| Sintered or not sintered | Not sintered | Not sintered | Not sintered | sintered |
| Fiber eq. Diameter (μm) | 35 | 22 | 17 | 22 |
| Fiber alloy | Fecralloy 1.4767 mod | Fecralloy 1.4767 mod | Fecralloy 1.4767 mod | Fecralloy 1.4767 mod |
| Fiber production method | coil shaved | bundle drawn | bundle drawn | bundle drawn |

For the three consecutive layers Lx, a ratio Hx/kx*Ax of 1.45E+9 1/m$^3$ is obtained. As Ax is substantially identical along the flow path 290, the three consecutive layers Lx, are provided with a substantially constant Hx/kx of 1.85E+7 1/m.

This filter medium has a total thickness Htotal (being in this embodiment the sum of H1, H2, H3 and H4) of 201.5 mm. All layers L1, L2, L3 and L4 are provided one adjacent to the other and having the surface of the layer oriented to the inflow side, in contact with the surface of the layer oriented to the outflow side of the upfront adjacent layer.

Properties of alternative embodiments of a filter media are given in tables 3, 4, 5, 6 and 7. Identical references refer to similar features as shown in FIG. 2.

TABLE 3

|  | L1 (201) | L2 (202) | L3 (203) | L4 (204) |
|---|---|---|---|---|
| Hx (mm) | 261.6 | 121.1 | 75.0 | 0.3 |
| Ax (m$^2$) | 0.0127 | 0.0127 | 0.0127 | 0.0127 |
| kx (m$^2$) | 6.23E−09 | 2.88E−09 | 1.79E−09 | 6.86E−11 |
| Porosity (%) | 97 | 97 | 97 | 80 |
| Sintered or not sintered | Not sintered | Not sintered | Not sintered | sintered |
| Fiber eq. Diameter (μm) | 35 | 22 | 17 | 22 |
| Fiber alloy | Fecralloy 1.4767 mod | Fecralloy 1.4767 mod | Fecralloy 1.4767 mod | Fecralloy 1.4767 mod |
| Fiber production method | coil shaved | bundle drawn | bundle drawn | bundle drawn |

TABLE 4

|  | L1 (201) | L2 (202) | L3 (203) | L4 (204) |
|---|---|---|---|---|
| Hx (mm) | 27.2 | 12.6 | 6.15 | 0.3 |
| Ax (m$^2$) | 0.0127 | 0.0127 | 0.0127 | 0.0127 |
| kx (m$^2$) | 6.23E−09 | 2.88E−09 | 1.41E−09 | 6.86E−11 |
| Porosity (%) | 97 | 97 | 97 | 80 |
| Sintered or not sintered | Not sintered | Not sintered | Not sintered | sintered |
| Fiber eq. Diameter (μm) | 35 | 22 | 12 | 22 |

TABLE 4-continued

|  | L1 (201) | L2 (202) | L3 (203) | L4 (204) |
|---|---|---|---|---|
| Fiber alloy | Fecralloy 1.4767 mod | Fecralloy 1.4767 mod | Fecralloy 1.4767 mod | Fecralloy 1.4767 mod |
| Fiber production method | Coil shaved fibre | Bundle drawn | Bundle drawn | Bundle drawn |

TABLE 5

|  | L1 (201) | L2 (202) | L3 (203) | L4 (204) |
|---|---|---|---|---|
| Hx (mm) | 181.6 | 75.0 | 39.6 | 0.3 |
| Ax (m$^2$) | 0.0127 | 0.0127 | 0.0127 | 0.0127 |
| kx (m$^2$) | 4.79E−09 | 1.94E−09 | 1.03E−09 | 6.86E−11 |
| Porosity (%) | 95 | 95 | 95 | 80 |
| Sintered or not sintered | Not sintered | Not sintered | Not sintered | sintered |
| Fiber eq. Diameter (μm) | 35 | 22 | 17 | 22 |
| Fiber alloy | Fecralloy 1.4767 mod | Fecralloy 1.4767 mod | Fecralloy 1.4767 mod | Fecralloy 1.4767 mod |
| Fiber production method | Coil shaved fibre | Bundle drawn | Bundle drawn | Bundle drawn |

TABLE 6

|  | L1 (201) | L2 (202) | L3 (203) | L4 (204) |
|---|---|---|---|---|
| Hx (mm) | 343.9 | 142.0 | 75.0 | 0.3 |
| Ax (m$^2$) | 0.0127 | 0.0127 | 0.0127 | 0.0127 |
| kx (m$^2$) | 4.70E−09 | 1.94E−09 | 1.03E−09 | 6.86E−11 |
| Porosity (%) | 95 | 95 | 95 | 80 |
| Sintered or not sintered | Not sintered | Not sintered | Not sintered | sintered |
| Fiber eq. Diameter (μm) | 35 | 22 | 17 | 22 |
| Fiber alloy | Fecralloy 1.4767 mod | Fecralloy 1.4767 mod | Fecralloy 1.4767 mod | Fecralloy 1.4767 mod |
| Fiber production method | Coil shaved fibre | Bundle drawn | Bundle drawn | Bundle drawn |

TABLE 7

|  | L1 (201) | L2 (202) | L3 (203) | L4 (204) |
|---|---|---|---|---|
| Hx (mm) | 20.6 | 8.5 | 2.5 | 0.3 |
| Ax (m$^2$) | 0.0127 | 0.0127 | 0.0127 | 0.0127 |
| kx (m$^2$) | 4.70E−09 | 1.94E−09 | 5.71E−10 | 6.86E−11 |
| Porosity (%) | 95 | 95 | 95 | 80 |
| Sintered or not sintered | Not sintered | Not sintered | Not sintered | sintered |
| Fiber eq. Diameter (μm) | 35 | 22 | 12 | 22 |
| Fiber alloy | Fecralloy 1.4767 mod | Fecralloy 1.4767 mod | Fecralloy 1.4767 mod | Fecralloy 1.4767 mod |
| Fiber production method | Coil shaved fibre | Bundle drawn | Bundle drawn | Bundle drawn |

As shown in FIG. 1 and FIG. 2, the filter elements may comprise additional parts, such as a filter medium holder 180 respectively 280, at the inflow side 110 respectively 210, and/or a filter medium holder 181 respectively 281, at the inflow side 120 respectively 220. These filter medium holder, e.g. welded or woven wire meshes, are to prevent the filter material to be displaced to the exterior of the housing, in case of e.g. accidental overpressures or alike.

Further, additional nipples for measuring pressure and/or temperature between the layers may be provided.

The embodiments of FIGS. 1 and 2 are particularly suitable for diesel soot particulate filter in trucks and buses. This embodiment has the particular advantage that some embodiments of the present invention provide a filter medium, which provides acceptable soot loading capacity, however, require less volume as compared to presently known soot filter media.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A filter medium having an inflow side and an outflow side defining a flow direction, said filter medium comprising:
   at least n consecutive layers Lx of fiber media, x varying from 1 to n, n being more than or equal to 2, L1 being the layer of the n consecutive layers closest to the inflow side of said filter medium and Ln being the layer of the n consecutive layers closest to the outflow side of said filter medium,
   wherein for all layers Lx of the at least n consecutive layers, the ratio Hx/(kx*Ax) is identical within measurement tolerances,
   wherein Hx is the average thickness of the layer Lx in flow direction, Ax is the average surface area of cross sections according to planes perpendicular to the flow direction, and kx is the permeability coefficient of this layer Lx,
   wherein Hx varies for each of the Lx layers, and
   wherein the fiber media of at least part of the layers of the filter medium comprises metal fibers.

2. The filter medium according to claim 1, wherein all n consecutive layers have an equal ratio of Hx/kx.

3. The filter medium according to claim 1, wherein the filter medium comprises at least one additional layer Lm of fiber media.

4. The filter medium according to claim 3, wherein the at least one additional layer Lm of fiber media is provided downstream in flow direction from the at least n consecutive layers Lx.

5. The filter medium according to claim 3, wherein the at least one layer Lm is a sintered layer.

6. The filter medium according to claim 1, wherein all layers have a equal cross sectional surface, being the surface of a cross section according to a plane perpendicular to the flow direction.

7. The filter medium according to claim 1, wherein said fiber media of at least part of the layers of the filter medium consists of metal fibers.

8. The filter medium according to claim 1, wherein said metal fibers are bundle drawn metal fibers.

9. The filter medium according to claim 1, wherein at least one of the layers comprises a sintered layer.

10. The filter medium according to claim 1, wherein each of n consecutive layers Lx comprises a non sintered layer.

11. The filter medium according to claim 1, wherein each of the at least n consecutive layers Lx comprises fibers, the fibers of each of said layers Lx have an equivalent diameter Dx, for which Dx≧Dx+1, for which 1≦x≦n, resulting in Hx varying for each of the Lx layers.

12. The filter medium according to claim 1, wherein all layers Lx of the n consecutive layers have a porosity in the range of 90% to 99%.

13. The filter medium according to claim 1, wherein at least one of the layers comprises a catalyst.

14. The filter medium according to claim 1, wherein said filter medium further comprises metal foam layers or porous medium layers comprising hollow metal spheres.

* * * * *